United States Patent

[11] 3,596,206

[72] Inventors Walter J. Loria
420 E. 86th St., New York, N.Y. 10028;
Jerome Suhre, 2370 Seneca Road, Scotch Plains, N.J. 07076
[21] Appl. No 874,543
[22] Filed Nov. 6, 1969
[45] Patented July 27, 1971

[54] TRANSISTOR OSCILLATOR INCLUDING ULTRASONIC GENERATOR CRYSTAL
15 Claims, 2 Drawing Figs.

[52] U.S. Cl. .......... 331/116 R, 259/1 R, 259/72, 310/8.1, 310/8.7, 331/158
[51] Int. Cl. .......... B01f 11/02, H03b 5/36, H04r 17/10
[50] Field of Search .......... 331/116, 158; 310/8.1, 8.2, 8.7; 259/1 R, 72

[56] References Cited

UNITED STATES PATENTS

| | | | |
|---|---|---|---|
| 3,100,886 | 8/1963 | Marks | 331/116 X |
| 3,302,131 | 1/1967 | Pyatt | 331/116 X |
| 3,487,237 | 12/1969 | Krenke | 310/8.1 |
| 3,516,645 | 6/1970 | Arndt | 310/8.1 X |

*Primary Examiner*—Roy Lake
*Assistant Examiner*—Siegfried H. Grimm
*Attorney*—Adolph C. Hugin

ABSTRACT: Ultrasonic oscillators having electronic transducers and excitation circuits for the transducers in which the transducers can be disconnected from the oscillator without causing damage. The excitation circuit comprises a primary and a secondary circuit, in which the primary circuit is adapted to be energized with AC and is provided with a rectifier therein for producing a source of pulsating DC for energizing the oscillator system. The primary circuit includes a transistor having a collector-emitter circuit connected through the primary winding of a transformer across the pulsating DC source and having its base connected to a voltage divider, also across the pulsating DC source, such that the transistor is biased nearly to cutoff. A feedback circuit is provided having a coil inductively coupled to the transformer primary and electrically connected to the transistor emitter and through a blocking capacitor to the transistor base. The primary winding and feedback coil are wound with numbers of turns to resonate at a frequency higher than the operating range of the transistor. A secondary circuit comprising a transformer secondary winding connected across the transducer is wound inductively coupled to the primary winding and to the feedback coil such that when introduced into the oscillator circuit physically or by closure of the transducer circuit connection thereto it tunes the oscillator to the resonant frequency of the transducer, which is within the operating range of the transistor. This provides for inherently making the oscillator operative when the secondary is introduced and making it quiescent, i.e., nonoscillatory, when the secondary circuit is removed physically or electrically.

INVENTORS
Walter J. Loria
Jerome Suhre

BY Adolph C. Hugin
ATTORNEY

TRANSISTOR OSCILLATOR INCLUDING ULTRASONIC GENERATOR CRYSTAL

FIELD OF INVENTION

This invention pertains to ultrasonic oscillators and particularly to such oscillators used as activators for cleaners in which the ultrasonic oscillators used as activators for cleaners in which the ultrasonic oscillations are produced by an electronic transducer, such as a piezoelectric crystal.

BACKGROUND OF INVENTION

In the past, such oscillators have been manually tuned or some frequency correcting feedback system employed to change the oscillator frequency to match the changing resonant frequency of the transducer which they fed. This was necessary because the transducer resonant frequency changes with temperature and with the liquid level or amount of load to which they are coupled. These high power oscillators or oscillator-amplifiers have required a protective circuit, usually an interlock, to prevent the disconnection of the transducer while the power is applied. Disconnection of the transducer with power applied thereto would produce internal arcing in the generator or breakdown of associated capacitors due to excessive voltages developed by the loss of the load. Transistors are known to be especially susceptible to instant destruction by excessive voltage above their operating limitations, even if only of short duration.

SUMMARY OF THE INVENTION

An object of the present invention is to provide an improved ultrasonic oscillator which will be free from excessive voltages when the transducer is disconnected from the system.

Another object of this invention is to provide an improved ultrasonic oscillator protected against excessive voltages on the disconnection of the electronic transducer from the circuit without the use of feedback to maintain resonance with the transducer, or any interlock to protect the transistor or capacitors.

The present ultrasonic oscillator invention includes an electronic transducer and an improved excitation circuit therefor. The excitation circuit comprises a primary circuit adapted to be energized by an alternating current source from which a pulsating DC source is developed. This pulsating current source energizes a transformer primary winding through a transistor biased almost to cutoff voltage, and having a feedback coil inductively coupled to the primary winding and connected to the transistor base. The primary winding and feedback coil are wound with numbers of turns to resonate at a frequency higher than that at which the transistor will operate, and the electronic transducer is chosen with a resonant frequency within the operating frequency of the transistor. Energization of the transducer is provided by the transformer secondary winding, which is built with an inductance, which, when shunted by the electrostatic capacitance of the transducer, tunes the oscillator to the resonant frequency of the transducer.

Further objects and advantages of this invention will be apparent from the following description referring to the accompanying drawing, and the features of novelty which characterize this invention will be pointed out with particularity in the claims appended to and forming a part of this specification.

BRIEF DESCRIPTION OF FIGURES OF DRAWING

In the drawing,

FIG. 1 is a schematic diagram illustrating the preferred embodiment of the invention, wherein the transformer is provided with electrically unconnected primary and secondary windings; and FIG. 2 is a schematic diagram illustrating another embodiment of the invention in which the transformer primary winding forms part of the secondary winding.

DETAILED DESCRIPTION OF INVENTION

Figure 1:
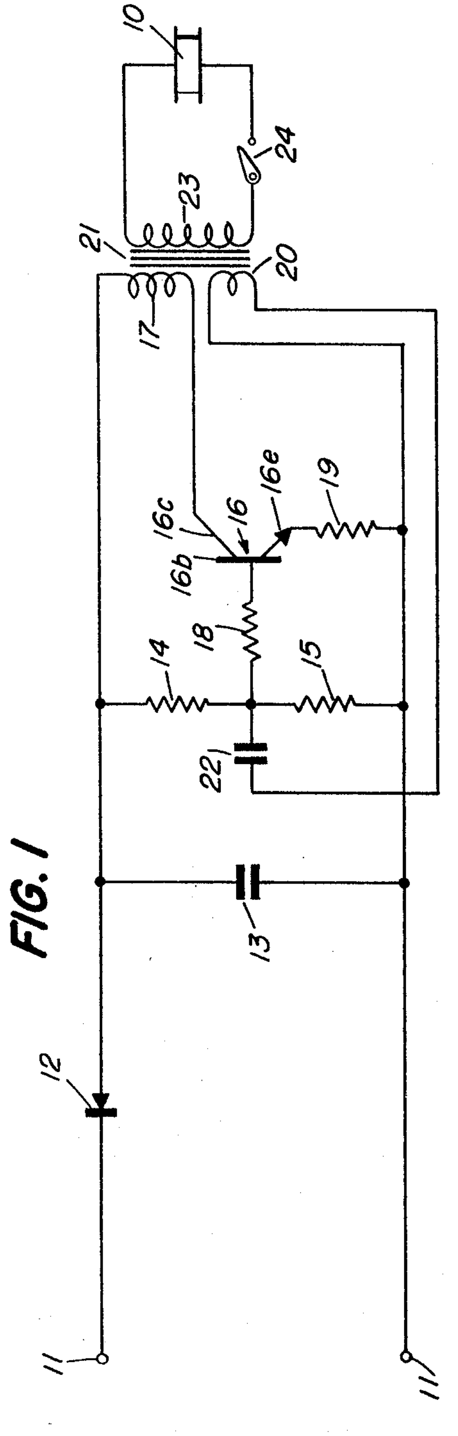

Referring to the drawing, FIG. 1 illustrates an improved ultrasonic oscillator provided with a suitable electronic transducer 10 of the piezoelectric type energized by an excitation circuit supplied by a suitable voltage, such as an alternating current power source, connected to system terminals 11. The excitation circuit includes a primary circuit and a secondary circuit, which, in the preferred embodiment shown in this figure, are not electrically connected. The oscillator excitation is provided by a pulsating DC source, which is conveniently supplied by a rectifier 12 connected in series with one of the terminals 11. The rectifier 12 changes the alternating current to a pulsating direct current. In order to provide a low impedance bypass around the rectifier and to prevent the ultrasonic frequency developed by the oscillator from entering the AC source, a capacitor 13 is connected across the pulsating current source formed by the rectifier.

An important aspect of this invention is the provision of a primary excitation circuit which is in nonoscillatory state or quiescent when the secondary circuit is uncoupled or open and is rendered operative and tuned to the resonant frequency of the transducer when its secondary circuit is closed and coupled to the primary circuit. This is obtained by connecting a voltage divider, comprising resistors 14 and 15, across the pulsating current source and providing a transistor 16 having its collector-emitter circuit connected in series with a transformer primary winding 17 also across the pulsating current source. The base **16*b* of the transistor is connected to the voltage divider between the resistances 14 and 15, which are so proportioned as to bias the transistor nearly to its cutoff; that is, these resistances are adjusted so that when the circuit is in nonoscillating condition the collector current is limited to a very low value of only a few milliamperes, a condition known as class "B" operation. The base 16*b* preferably is connected to the voltage divider through a low resistance series resistor 18 provided to limit the transistor base current. The transistor collector 16*c* preferably is connected to the primary winding 17 and the emitter 16*e* preferably is connected through a low resistance 19 to the other side of the pulsating current source. This resistance 19** provides an additional bias voltage to compensate for changes in the transistor characteristics caused by transistor heating during normal operation.

Transistors, such as the power transistor 16, have an upper frequency limit beyond which they will not operate. Thus, by making the primary circuit so that it will resonate at a frequency above the operating limit of transistor 16, the system will not oscillate unless this resonant frequency is reduced into the operative range of the transistor. A feedback coil 20 is wound on the transformer core 21 and the energy induced in this coil is fed back to the input of the transistor through a blocking capacitor 22 in series with the coil 20 and connected to the voltage divider connection of the transistor base **16*b*. The resultant resonant frequency of the primary circuit, including the inductance of winding 17 and coil 20 with the capacitance of capacitor 22, is made such as to be higher than the operating frequency of the transistor 16. This is determined by the nature of the transformer core and the number of turns of winding 17 and coil 20**.

In order to obtain the best possible operation of the ultrasonic vibrator formed by the electronic transducer 10, its excitation is provided by an oscillator frequency which will be substantially the resonant frequency of the transducer. This resonant frequency is defined as the frequency which will cause a maximum mechanical vibratory motion of the transducer for the production of ultrasonic action. Transducers of this type are conventionally made of piezoelectric crystals, such as barium titanate, lead zirconate, or similar material. A further requirement for generation of the resonant frequency of the transducer by the oscillator energizing system is that it be within the operating range of the transistor and it must, therefore, be chosen to be in this range in order to be operable by the oscillator of which it forms a part.

The transducer 10 is connected across a secondary winding 23 of the transformer, with which it forms the secondary circuit of the oscillator. This secondary winding 23 is wound with a number of turns so as to provide an inductance which, when shunted by the electrostatic capacitance of the transducer, tunes the circuit to the resonant frequency of the transducer. Thus, this secondary circuit is the operative frequency-determining circuit, and is tuned to a frequency well within the frequency capabilities of the transistor 16. Further, this frequency will change a few kilocycles up or down as dictated by the requirements of the transducer to meet the changing load, temperature or liquid which it drives. This circuit is made with an inherently high inductance to capacitance ratio and is, therefore, particularly responsive to changes in capacitance. Since the electronic transducer capacitance is common to both the electrical circuit and the transducer, any change encountered by the transducer is reflected by a change in capacitance, resulting in a frequency shift to match the new frequency requirements of the transducer. This provides a highly effective and desirable automatic tuning.

Connection and disconnection of the system into and from operative condition may be accomplished either by inserting or removing, respectively, the secondary circuit of the oscillator. This can be done physically, or be done electrically by closing or opening a suitable switch 24 in the secondary circuit. The inherent advantage of this feature is that removal of the transducer secondary circuit, as by opening the switch 24, removes this circuit from the system, and the oscillator circuit then includes only the primary circuit which is a nonoscillatory system, and therefore is automatically placed in a quiescent state. This is accomplished without the need of any circuit protective devices or auxiliary circuitry because of the inherent characteristics of the circuits.

Figure 2:
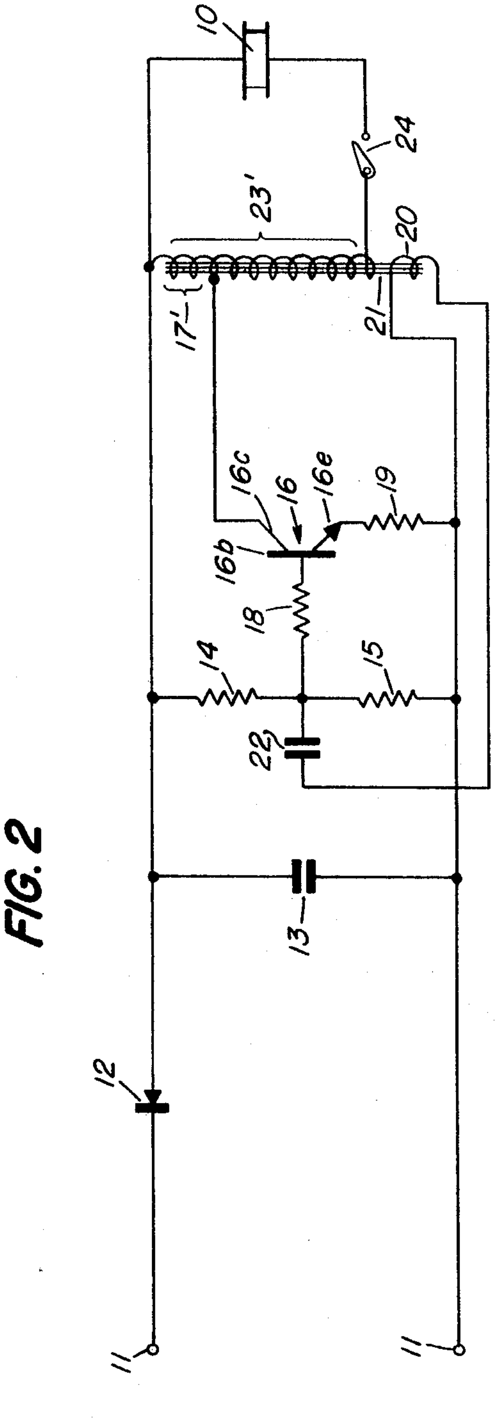

A modification of the oscillator of FIG. 1 is shown in FIG. 2 in which all of the basic elements are the same, except for the transformer primary and secondary windings. The same reference numbers designate corresponding elements in the two figures, with the addition of a prime to the reference numbers for the two transformer windings in FIG. 2. This FIG. 2 transformer is of the conventional auto-transformer type, in which a part of the secondary winding 23′ is used as the primary winding 17′, so that the two windings are both conductively and inductively coupled permanently. This may, in some instances, not be found as satisfactory as the FIG. 1 embodiment because of the direct connection of one side of the transducer 10 to the AC source 11, even though this is through the diode 12. The operation of this FIG. 2 oscillator is the same as that of FIG. 1, except that removal of the secondary circuit from the operative system can only be done electrically by opening the switch 24.

In practice, it has been found practical to use oscillators having from one transistor and one transducer to oscillators using multiple transistors and multiple transducers. The transducers can be mounted on the bottom or the sides of the containers or tanks or on both sides and bottom. In addition, crystal transducers can be bonded to the interior of stainless steel units and hermetically sealed therein for use as immersion ultrasonic vibrators immersible into liquid in existing tanks. All of these ultrasonic vibrators have been found very useful for cleaning objects in fluid activated thereby.

While particular embodiments of this invention have been described, modifications thereof will occur to those skilled in the art. It is to be understood, therefore, that this invention is not to be limited to the exact details disclosed.

The invention we claim is:

1 An ultrasonic oscillator comprising an electronic transducer and an excitation circuit for said transducer; said excitation circuit comprising a primary and a secondary circuit; said primary circuit having terminals for connecting it to an alternating circuit source, a rectifier connected in said primary circuit for changing alternating current to a pulsating current and providing a pulsating current source, a voltage divider connected across said pulsating current source, a transformer having a primary winding, a transistor having a collector-emitter circuit connected through said primary winding across said pulsating current source, said transistor having a base, means connecting said base to a point on said voltage divider to bias said transistor nearly to cutoff, a feedback circuit comprising a coil inductively coupled with said primary winding, means for electrically connecting said coil between said transistor emitter and base, said means connecting said coil to said base comprising a blocking capacitor in series therewith, said primary winding and said feedback coil being built to resonate at a frequency higher than that at which said transistor will operate; said secondary circuit having a resonant frequency lower than the maximum operating frequency of said transistor, means for connecting said secondary winding across said transducer for providing energization thereto, and said secondary winding being built to provide an inductance shunted by the electrostatic capacity of said transducer to tune said oscillator to the resonant frequency of said transducer.

2. An oscillator as defined in claim 1 wherein said transducer is of the piezoelectric-type.

3. An oscillator as defined in claim 1 having a low impedance bypass connected across said pulsating current source.

4. An oscillator as defined in claim 1 wherein said primary winding and said feedback coil are wound with numbers of turns to resonate at said resonant frequency of said transducer.

5. An oscillator as defined in claim 1 wherein said secondary winding is wound with a number of turns to provide said inductance.

6. An oscillator as defined in claim 1 having a resistor in series with said transistor base for limiting the base current.

7. An oscillator as claimed in claim 1 having a low resistance in series with said transistor emitted for providing a bias voltage thereto to compensate for changes in characteristics caused by transistor heating during normal operation.

8. An oscillator as claimed in claim 1 wherein said transformer secondary winding includes as part thereof said primary winding.

9. An oscillator as claimed in claim 1 wherein said transformer has a magnetic core on which said primary winding and said feedback coil are wound with numbers of turns to resonate at said higher frequency.

10. An oscillator as defined in claim 9 wherein said secondary winding also is wound with a number of turns on said core to provide said inductance.

11. An ultrasonic oscillator comprising a crystal electronic transducer and an excitation circuit for said transducer; said excitation circuit comprising a primary and a secondary circuit; said primary circuit having terminals for connecting it to an alternating current source, a rectifier connected in said primary circuit for changing the alternating current to a pulsating direct current and providing a pulsating current source, a low-impedance bypass across said pulsating current source, a voltage divider connected across said pulsating current source, a transformer having a primary winding, a power transistor having a collector-emitter circuit connected through said primary winding across said pulsating current source, said transistor having a base, means connecting said transistor base to a point on said voltage divider to bias said transistor nearly to cutoff, a feedback circuit comprising a coil inductively coupled with said primary winding, means for electrically connecting said coil between said transistor emitter and base, the means connecting said coil to said base comprising a blocking capacitor in series therewith, said primary winding and said feedback coil being wound on a magnetic core with numbers of turns to resonate at a frequency higher than that at which said transistor will operate; said secondary circuit comprising a secondary winding for said transformer, said transducer having a resonant frequency lower than the maximum operating frequency of said transistor, means for connecting said secondary winding across said transducer having a resonant frequency lower than the maximum operating frequency of said transistor, means for connecting said secondary winding across said transducer for providing energization thereto, and said secondary winding being wound with a number of turns to provide an inductance shunted by the electrostatic capacity of said crystal transducer to tune said oscillator to the resonant frequency of said transducer.

12. An ultrasonic oscillator as defined in claim 11 having a resistor in series with said transistor base for limiting the base current.

13. An ultrasonic oscillator as defined in claim 11 having a low resistance in series with said emitter for providing a bias voltage thereto to compensate for changes in characteristics caused by transistor heating during normal operation.

14. An ultrasonic oscillator as defined in claim 11 wherein said transformer secondary winding includes as a part thereof said primary winding.

15. An oscillator as defined in claim 11 wherein said secondary winding also is wound on said transformer core.

UNITED STATES PATENT OFFICE
CERTIFICATE OF CORRECTION

Patent No. 3,596,206 Dated July 27, 1971

Inventor(s) Walter J. Loria et al.

It is certified that error appears in the above-identified patent and that said Letters Patent are hereby corrected as shown below:

Column 1, lines 9 and 10, cancel "the ultrasonic - oscillators used as activators for cleaners in which".

Signed and sealed this 11th day of April 1972.

(SEAL)
Attest:

EDWARD M.FLETCHER,JR.
Attesting Officer

ROBERT GOTTSCHALK
Commissioner of Patents